United States Patent
Byun (10) Patent No.: US 9,356,294 B2
(45) Date of Patent: May 31, 2016

(54) SECONDARY BATTERY INCLUDING COLLECTORS WITH PORES AND MANUFACTURING METHOD THEREOF

(71) Applicant: Samsung SDI Co., Ltd., Yongin, Gyeonggi-do (KR)

(72) Inventor: In-Seop Byun, Yongin (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 317 days.

(21) Appl. No.: 13/689,423

(22) Filed: Nov. 29, 2012

(65) Prior Publication Data

US 2013/0230756 A1 Sep. 5, 2013

Related U.S. Application Data

(60) Provisional application No. 61/606,196, filed on Mar. 2, 2012.

(51) Int. Cl.
*H01M 4/74* (2006.01)
*H01M 10/0587* (2010.01)
*H01M 4/80* (2006.01)
*H01M 10/04* (2006.01)
*H01M 10/0525* (2010.01)

(52) U.S. Cl.
CPC ............ *H01M 4/80* (2013.01); *H01M 10/04* (2013.01); *H01M 10/049* (2013.01); *H01M 10/0431* (2013.01); *H01M 10/0525* (2013.01); *H01M 10/0587* (2013.01); *Y10T 29/49108* (2015.01)

(58) Field of Classification Search
CPC ... H01M 4/80; H01M 10/04; H01M 10/0431; H01M 10/049; H01M 10/0525; H01M 10/0587
USPC .......................................................... 429/241
See application file for complete search history.

(56) References Cited

U.S. PATENT DOCUMENTS 6,399,253 B1 6/2002 Chang et al.
7,191,502 B1 3/2007 Ashizawa et al.
(Continued)

FOREIGN PATENT DOCUMENTS

JP 2005-243342 A 9/2005
KR 10-2009-0091149 A 8/2009
(Continued)

OTHER PUBLICATIONS

Jeon et al., Machine translation of KR 2011026255 A, Mar. 2011.*

*Primary Examiner* — Sean P Cullen
(74) *Attorney, Agent, or Firm* — Knobbe, Martens, Olson & Bear, LLP (57) ABSTRACT

A secondary battery and a manufacturing method thereof are disclosed. In one embodiment, the battery includes an electrode assembly and a case accommodating the electrode assembly. The electrode assembly may include i) a first electrode plate comprising a first collector and a first active material layer formed on at least one side of the first collector, ii) a second electrode plate comprising a second collector and a second active material layer formed on at least one side of the second collector and iii) a separator interposed between the first and second electrode plates. In one embodiment, a plurality of pores are formed only in part of the first and second collectors.

20 Claims, 8 Drawing Sheets

(56) References Cited

U.S. PATENT DOCUMENTS

| | | |
|---|---|---|
| 2009/0136832 A1* | 5/2009 | Mitsuda et al. .................. 429/94 |
| 2010/0081051 A1 | 4/2010 | Taniguchi et al. |
| 2011/0236748 A1* | 9/2011 | Nakashima ............. H01M 2/26 429/163 |
| 2011/0244307 A1* | 10/2011 | He et al. ......................... 429/152 |
| 2012/0111730 A1 | 5/2012 | Choi et al. |
| 2013/0224582 A1* | 8/2013 | Mehata et al. ................. 429/211 |

FOREIGN PATENT DOCUMENTS

| | | |
|---|---|---|
| KR | 10-2011-0016979 A | 2/2011 |
| KR | 10-2011-0026255 A | 3/2011 |
| WO | WO 2011122239 A1 * | 10/2011 |

\* cited by examiner

FIG. 7A

SECONDARY BATTERY INCLUDING COLLECTORS WITH PORES AND MANUFACTURING METHOD THEREOF

RELATED APPLICATIONS

This application claims priority to and the benefit of Provisional Patent Application No. 61/606,196 filed on Mar. 2, 2012 in the U.S Patent and Trademark Office, the entire contents of which are incorporated herein by reference.

BACKGROUND

1. Field

The described technology generally relates to a secondary battery, and more particularly, to a secondary battery having improved lifetime and productivity.

2. Description of the Related Technology

Recent secondary batteries, used as power sources of a cellular phone, a notebook computer, a camcorder, etc., are small in size and large in capacity. Such a secondary battery is generally manufactured by accommodating an electrode assembly in a battery case, injecting an electrolyte into the battery case and then sealing the battery case. Here, the electrode assembly is formed by respectively coating active materials on positive and negative electrode collectors and then interposing a separator between the positive and negative electrode collectors.

The secondary battery may be divided into a cylinder-type battery using a cylindrical can, a prism-type battery using a prismatic can and a pouch-type battery using a thin-film pouch case made of a thin plate, according to the external appearance of a case having an electrode assembly accommodated therein. The electrode assembly is divided into i) a winding-type electrode assembly formed by winding a positive electrode collector, a separator and a negative electrode collector, which are sequentially stacked, and ii) a stacking-type electrode assembly formed by stacking a plurality of positive electrode collectors, a plurality of separators and a plurality of negative electrode collectors.

SUMMARY

One inventive aspect is a secondary battery and a manufacturing method thereof, in which the electrode assembly (including, but not limited to, a winding-type and a stacking-type) can be wetted in an electrolyte within a short period of time.

Another aspect is a secondary battery and a manufacturing method thereof, in which a central portion of the electrode assembly is easily wetted in an electrolyte, so that it is possible to prevent lithium dendriting.

Another aspect is a secondary battery including: an electrode assembly including a first electrode plate having a first active material layer formed on a first collector, a second electrode plate having a second active material layer formed on the second collector, and a separator interposed therebetween; and a case in which the electrode assembly and an electrolyte are accommodated, wherein at least one pore is formed in each of the first and second collectors.

The electrode assembly may be a winding-type electrode assembly, and may have a shape in which the first electrode plate, the second electrode plate and the separator interposed therebetween are wound.

The pore may be formed in a region corresponding to a central portion in the length direction of the electrode assembly.

The pore may be formed at every central portion of the first and second electrode plates overlapped with each other.

The diameter of the pore may be formed to about 0.1 μm to about 50 μm.

The first and second active material layers may be respectively formed on both surfaces of the first or second collector positioned at the inside of the electrode assembly.

The first and second active material layers may be formed on only inner surfaces of the first or second collectors positioned at the outermost portions of the electrode assembly, respectively.

Anther aspect is a manufacturing method of a secondary battery, the method including: forming at least one pore at a predetermined interval along the wound direction of first and second collectors; respectively forming first and second active material layers on the first and second collectors having the pores formed therein; and forming an electrode assembly by winding first and second electrode plates having the first and second active material layers respectively formed therein and a separator interposed between the first and second electrode plates, wherein the pore is formed at a central portion in the length direction of the electrode assembly.

The pore may be formed by laser.

The pore may be formed using a laser galvanometer.

A burr may not be formed at a peripheral portion of the pore.

Another aspect is a secondary battery, comprising: an electrode assembly; and a case accommodating the electrode assembly, wherein the electrode assembly comprises: a first electrode plate comprising a first collector and a first active material layer formed on at least one side of the first collector; a second electrode plate comprising a second collector and a second active material layer formed on at least one side of the second collector; and a separator interposed between the first and second electrode plates, wherein a plurality of pores are formed only in part of the first and second collectors.

In the above battery, the electrode assembly has a height, and wherein the pores are formed in a region adjacent to the middle portion of the height. In the above battery, the pores are formed only in the region. In the above battery, the pores are configured to infuse an electrolyte from the outermost surface of the electrode assembly to the inner most surface of the electrode assembly. In the above battery, each of the pores has a width less than 100 μm, wherein the width of the pore represents the greatest distance between two opposing points of the periphery of the pore. In the above battery, the width is in the range of about 0.1 μm to about 50 μm. In the above battery, the electrode plates and separator are wound such that each of the electrode plates includes repeating portions, and wherein the pores are formed in the repeating portions of the collectors such that the wound collectors have substantially aligned sets of pores.

In the above battery, at least one of the pores has a substantially regular geometric shape. In the above battery, the regular geometric shape comprises a substantially circular or polygonal shape. The secondary battery of claim 1, wherein the part is less than about 50% of the area of the electrode collectors. In the above battery, the first collector comprises a first plurality of sub-collectors which substantially overlap with each other, wherein the second collector comprises a second plurality of sub-collectors which substantially overlap with each other, wherein the first sub-collectors are alternately formed with respect to the second sub-collectors, and wherein the pores are formed in all of the first and second sub-collectors.

In the above battery, at least some of the pores formed in each of the sub-collectors are substantially aligned with at least some of the pores formed in the remaining sub-collectors so as to form a substantially linear passage. In the above battery, the linear passage is configured to infuse an electrolyte from the outermost surface of the electrode assembly to the inner most surface of the electrode assembly.

Another aspect is a method of manufacturing an electrode assembly for a secondary battery, comprising: providing first and second collectors; forming a plurality of pores only in part of the first and second collectors; forming a first active material layer on at least one side of the first collector; forming a second active material layer on at least one side of the second collector; and winding or stacking the first and second collectors with a separator interposed therebetween to form an electrode assembly.

In the above method, the electrode plates and separator are wound such that each of the electrode plates includes repeating portions, and wherein the pores are formed in the repeating portions of the collectors such that the wound collectors have substantially aligned pores. The above method further comprises infusing an electrolyte into substantially the center of the electrode assembly through the substantially aligned pores. In the above method, each of the pores has a width in the range of about 0.1 μm to about 50 μm, and wherein the width of the pore represents the greatest distance between two opposing points of the periphery of the pore.

In the above method, the pores are formed by a laser. In the above method, the periphery of each of the pores has a substantially smooth or even surface. In the above method, at least one of the pores is formed such that a burr is not created at the periphery of the pore.

DETAILED DESCRIPTION

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 1:
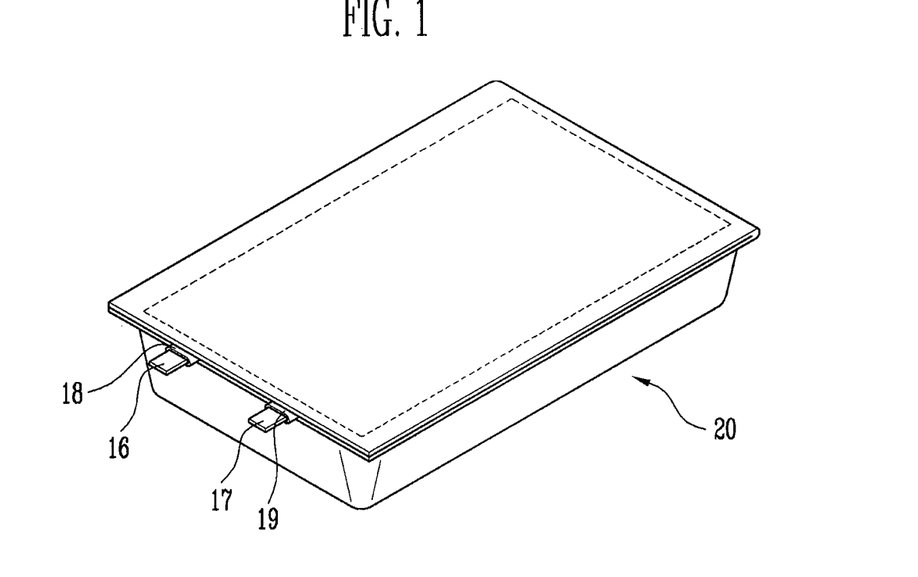
FIG. 1 is a perspective view showing a secondary battery according to an embodiment.
Figure 2:
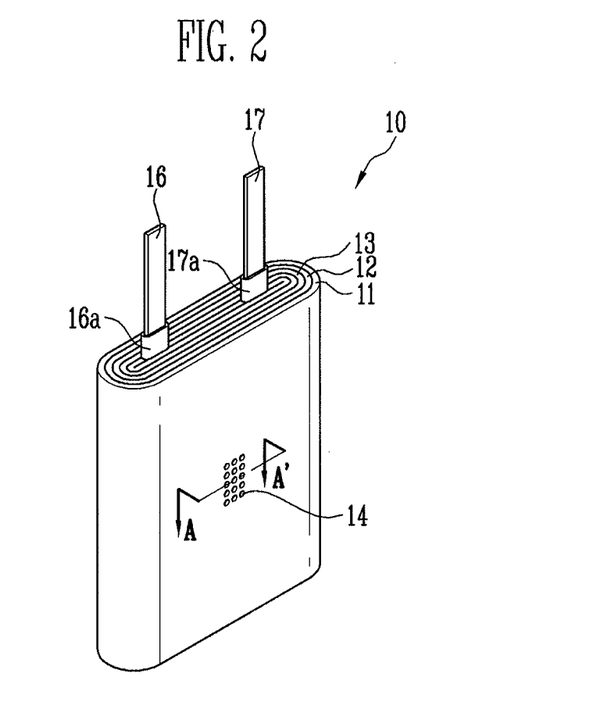
FIG. 2 is a perspective view showing a state in which an electrode assembly is wound according to one embodiment.
Figure 3:
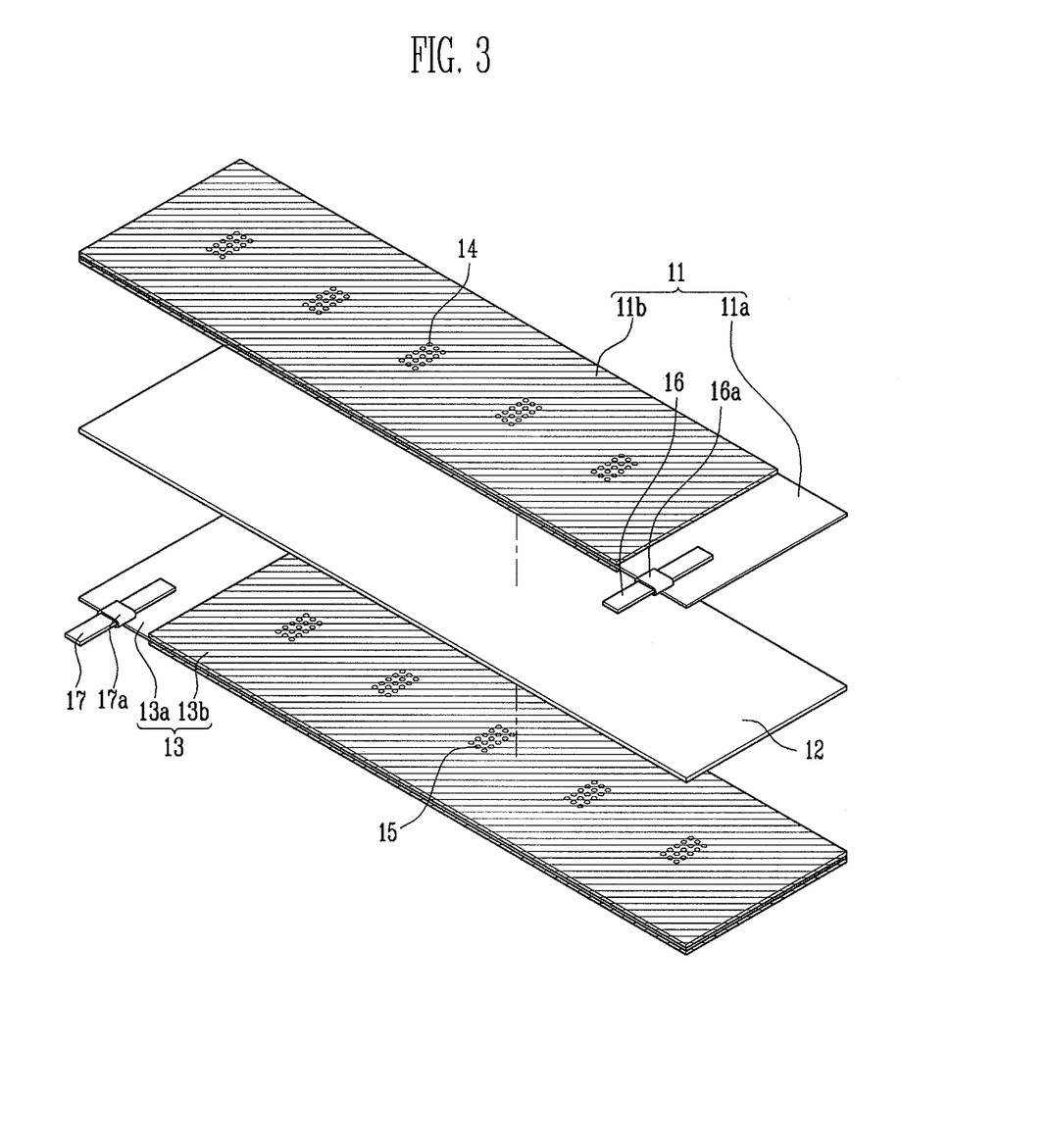
FIG. 3 is a perspective view showing a state before the electrode assembly is wound according to one embodiment.

FIG. 1 is a perspective view showing a secondary battery according to an embodiment. FIG. 2 is a perspective view showing a state in which an electrode assembly is wound according to the FIG. 1 embodiment. FIG. 3 is a perspective view showing a state before the electrode assembly is wound according to one embodiment.

Referring to FIGS. 1 and 2, the secondary battery according to this embodiment includes an electrode assembly 10 and a case 20 in which the electrode assembly 10 and an electrolyte (not shown) are accommodated. Here, as shown in FIGS. 2 and 3, the electrode assembly 10 includes i) a first electrode plate 11 having a first active material layer 11b formed on a first collector 11a, ii) a second electrode plate 13 having a second active material layer 13b formed on a second collector 13a, and iii) a separator 12 interposed between the first and second electrode plates 11 and 13. The electrode assembly 10 may be formed by sequentially stacking the first electrode plate 11, the second electrode plate 13 and the separator 12 interposed therebetween and then winding the stacked plates.

Figure 7A:
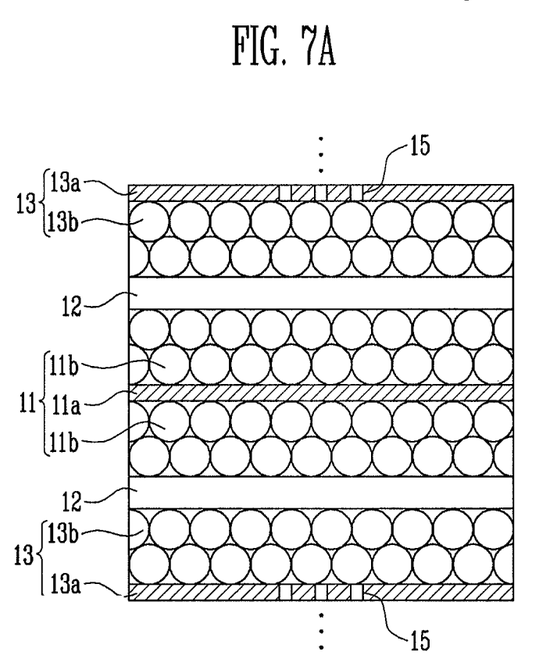
FIG. 7A is a cross-sectional view taken along line A-A' of FIG. 2 where the pores are located only at the outermost portion of the electrode assembly according to one embodiment.
Figure 7B:
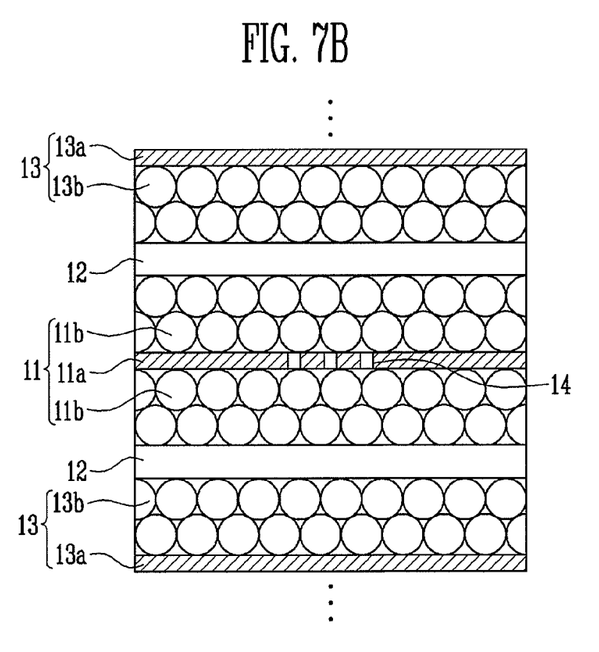
FIG. 7B is a cross-sectional view taken along line A-A' of FIG. 2 where the pores are located only at the innermost surface of the electrode assembly according to one embodiment.

In one embodiment, at least one pore 14 is formed in at least one of the first and second collectors 11a and 13a. For example, as shown in FIG. 7A, two pore groups may be located only in the outermost surface of the electrode assembly 10. As another example, as shown in FIG. 7B, one pore group may be located only in the innermost portion of the electrode assembly 10. The pore 14 may also be formed only between the outermost and innermost portions of the electrode assembly 10. In another embodiment, at least one pore 14 is formed in all of the first and second collectors 11a and 13a.

Although FIGS. 2, 4, 5A and 5B show electrode collectors of a winding-type electrode assembly, the present disclosure can be applied to other types of electrode assembly such as a stacking-type electrode assembly. Thus, sub-collectors described in this disclosure may refer to 1) a plurality of folded portions of the same electrode collector of the winding-type electrode assembly or 2) a plurality of individual sub-collectors of the stacking-type electrode assembly.

Figure 6A:
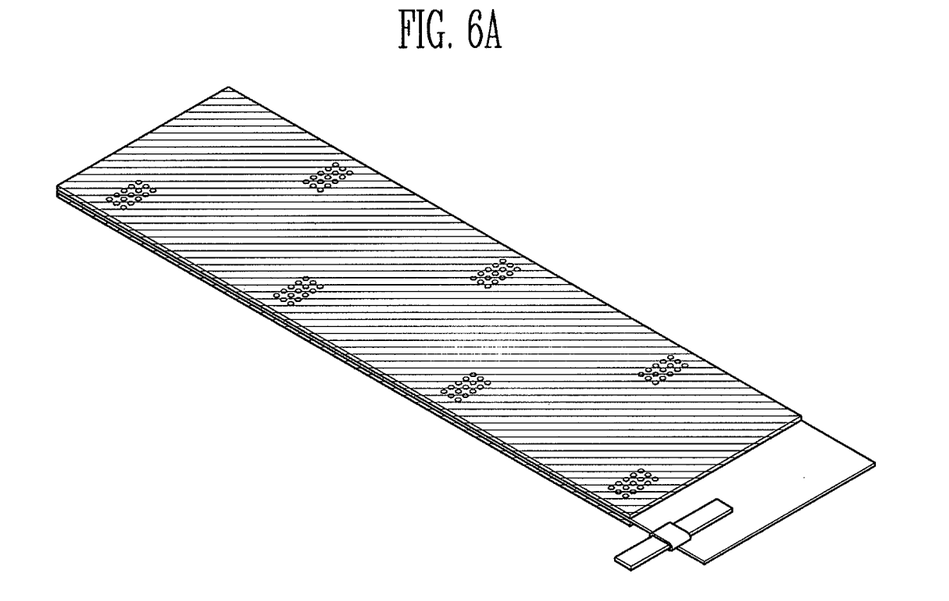
FIGS. 6A-6F show various arrangements of the pores according to one embodiment.
Figure 6B:
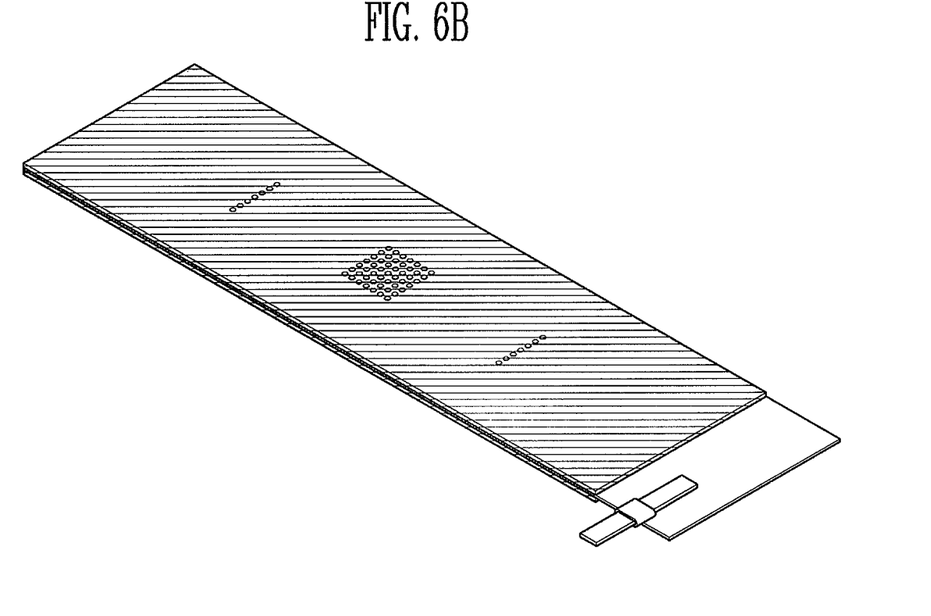
Figure 6C:
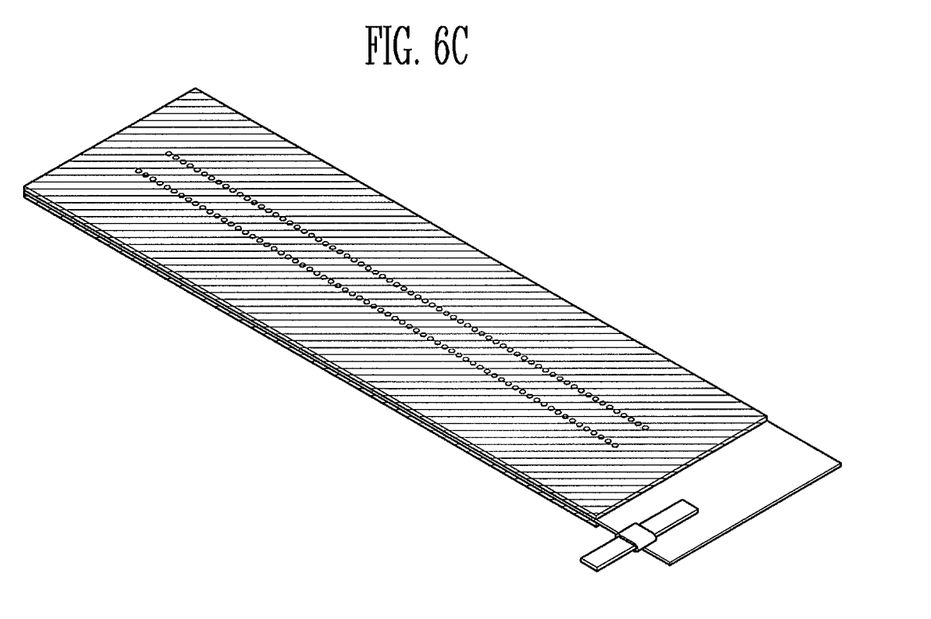
Figure 6D:
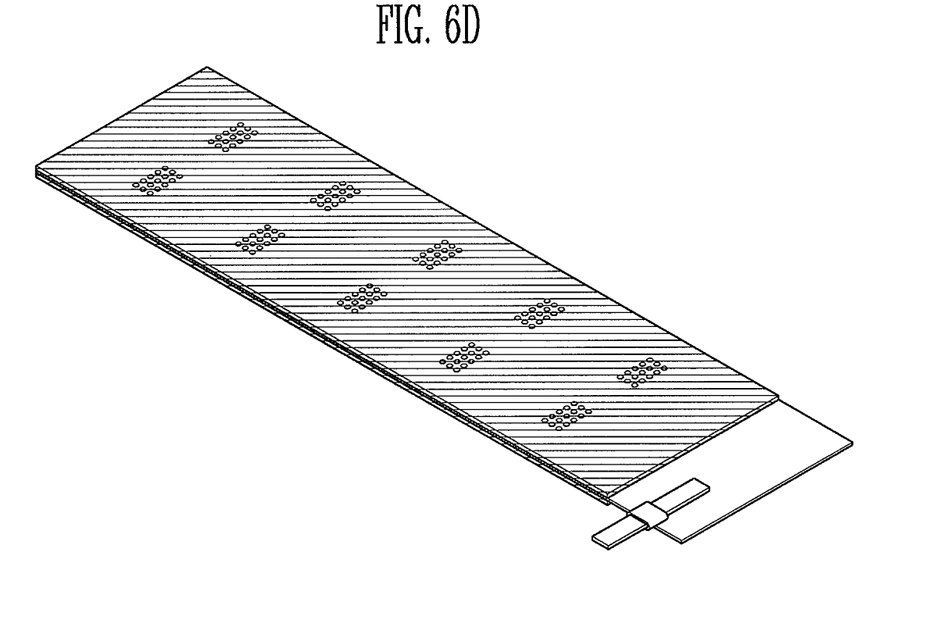
Figure 6E:
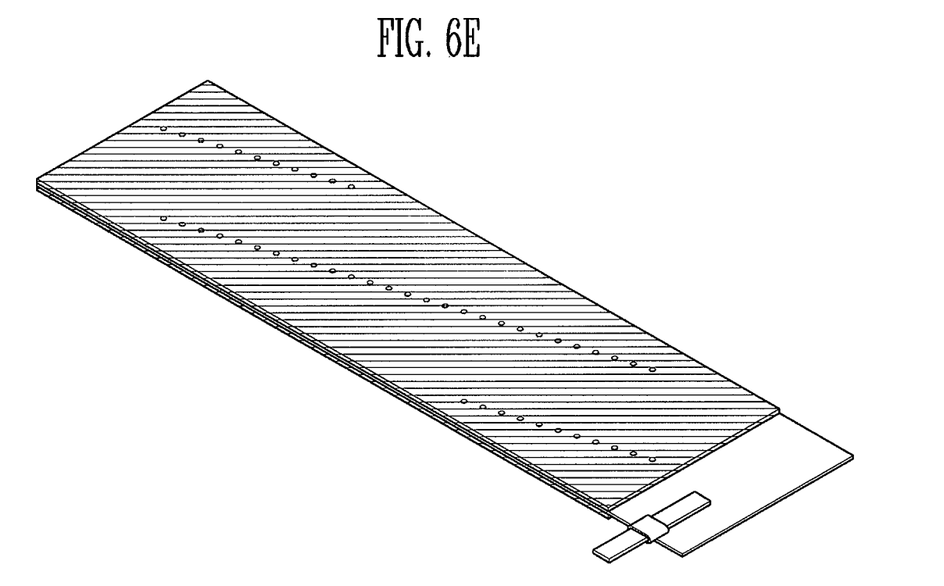
Figure 6F:
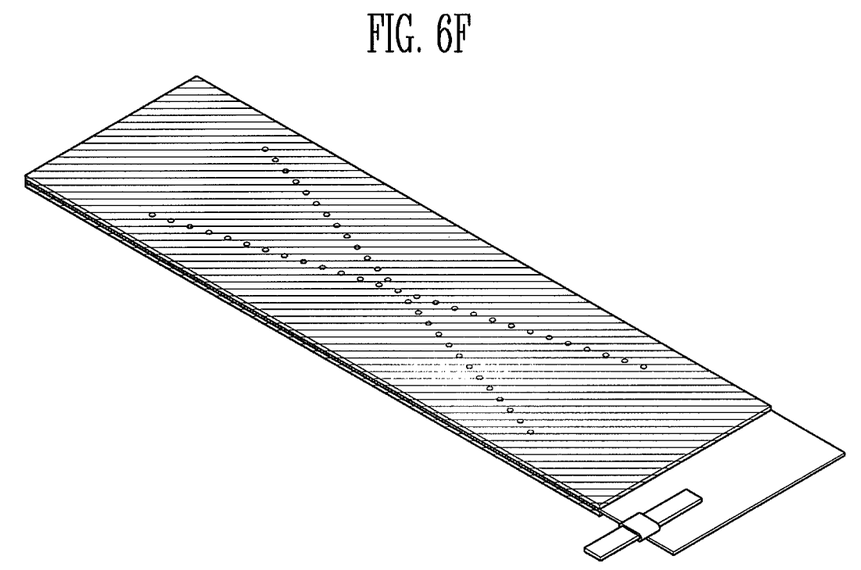

The pore 14 may include a plurality of pore groups which are formed at a central portion in generally the length direction of the electrode assembly 10. The pore groups may be spaced apart in a regular or an irregular interval from each other. The pore groups may be spaced apart so that the pores are continuously arranged in the given group in either a single line (FIGS. 6C, 6F and 6F), a plurality of substantially parallel lines (FIGS. 6A and 6D) or a combination of both (FIG. 6B). Furthermore, the pore groups may be formed in a zigzag form (FIG. 6A) or two-parallel forms (FIGS. 6C and 6D). Moreover, as shown in FIGS. 6A, 6B and 6D, at least one of the pore groups may have a square shape or rectangular shape in the length direction. In one embodiment, the pore groups are formed only in part of the first and second collectors 11a and 13a. The area of the part may be less than about 50% of the area of each of the electrode collectors.

In one embodiment, at least one of the pores has a substantially regular geometric shape. The regular geometric shape comprises a substantially circular or polygonal shape.

The pore 14 may be formed at every central portion of the overlapped and wound first and second electrode plates 11 and 13. The pore 14 may also be formed at every other central portion of the overlapped and wound first and second electrode plates 11 and 13. The pore 14 may be formed using a laser galvanometer, and therefore, a burr may not be formed at a peripheral portion of the pore 14.

The secondary battery is a rechargeable battery. The rechargeable battery may be a lithium ion secondary battery. The first and second electrode plates, which will be described later, may have positive and negative polarities, respectively. The first and second active material layers 11b and 13b may be positive and negative active material layers, respectively.

Charging/discharging operations of the secondary battery will be described. In the charging operation in which electrons are provided from a charger to the second electrode plate 13 of the secondary battery, lithium ions move from the first active material layer 11b to the second active material layer 13b. That is, the lithium ions generated from a lithium compound pass through the electrolyte and the separator 12 and is then intercalated into the second active material layer 13b, thereby performing the charging operation of the secondary battery. If the secondary battery is continuously charged without controlling the charging voltage thereof, the voltage is continuously increased. Thus, various types of safety elements, a control circuit, etc. are mounted to the charger and the secondary battery, so that it is possible to prevent the overcharging of the secondary battery.

In the discharging operation in which electrons are discharged from the secondary battery through the second electrode plate 13, the lithium ions intercalated into the second active material layer 13b move to the first active material layer 11b. That is, the lithium ions pass through the electrolyte and the separator 12 from the second active material layer 13b and are then deintercalated by the lithium compound, thereby performing the discharging operation of the secondary battery.

As such, in the charging/discharging operations, the lithium ions move between the first and second active material layers 11b and 13b through the electrolyte. When the electrode assembly 10 is a winding-type electrode assembly, the electrolyte can be infiltrated into the electrode assembly 10 through only the top and bottom portions of the electrode assembly 10, and hence it is difficult to infiltrate the electrolyte into the central portion in the length direction of the electrode assembly 10. Therefore, much aging time may be taken. During battery operation, lithium at the negative electrode collector (e.g., first collector 11a) gives up electrons to become positive lithium ions ($Li^+$), which dissolve into the electrolyte. This process is reversed during the recharge cycle, but the replated lithium adds unevenly to the electrode surface, and as the battery is charged and discharged, dendrites grow from the surface. Lithium dendriting may likely occur at the central portion of the electrode assembly 10, which is less wetted in the electrolyte. This may result in a problem of a decrease in the capacity of the battery, a fine short circuit between cells or possible explosions, etc.

Accordingly, in one embodiment, the pore 14 is formed in at least one of the first and second collectors 11a and 13a at a position corresponding to the central portion in the length direction of the electrode assembly 10. In another embodiment, various shapes and arrangement of pores as described above can be formed. The electrolyte can be easily infiltrated into the central portion of the electrode assembly 10 through the pore 14, and thus the electrode assembly can be wetted in the electrode assembly 10 within a short period of time.

The case 20 may be formed as a pouch, and accommodates the electrode assembly 10 and the electrolyte. The case 20 is formed with an accommodating part and a cover part, and a sealing part may be formed along the circumference around which the accommodating part and the cover part are overlapped with each other. First and second electrode tabs 16 and 17 drawn out to one side of the electrode assembly 10 are exposed to the outside of the case 20. In this case, insulation tapes 18 and 19 (see FIG. 1) are attached to the respective first and second electrode tabs 16 and 17 contacting the sealing part of the case 20 so as to improve the sealing performance between the case 20 and the first and second electrode tabs 16 and 17 and to ensure an electrical insulation state.

Lamination tapes 16a and 17a are respectively wound around portions at which the first and second electrode tabs 16 and 17 are extracted from the electrode assembly 10. The lamination tape 16a or 17a shields heat generated from the first or second electrode tab 16 or 17. The lamination tape 16a or 17a allows the electrode assembly 10 not to be pressed by an edge of the first or second electrode tab 16 or 17.

Moreover, the first and second active material layers 11b and 13b may be respectively formed on both surfaces of the first or second collector 11a and 13a positioned at the inside of the electrode assembly 10. The first and second active material layers 11b and 13b may be formed on only inner surfaces of the first or second collectors 11a and 13a positioned at the outermost portions of the electrode assembly 10, respectively.

Although the pouch-type case has been illustrated in this embodiment, the above embodiments may be applied to a case formed with a prismatic or cylindrical can.

Referring to FIG. 3, before the electrode assembly 10 (See FIG. 2) is wound, the first electrode plate 11, the second electrode plate 13 and the separator 12 have shapes extended long in one direction. The first and second electrode tabs 16 and 17 are formed on regions of the first and second electrode plates 11 and 13, respectively. In one embodiment, the first or second electrode plate 11 or 12 has pores 14 or 15 formed at a predetermined interval along the wound direction thereof.

In one embodiment, the pores 14 and 15 are formed in only base materials of the first and second electrode plates 11 and 13, i.e., in only the first and second collectors 11a and 13a, respectively. In one embodiment, the first and second active material layers 11b and 13b are formed on the first and second collectors 11a and 13a having the pores 14 and 15 formed therein, except regions to which the first and second electrode tabs 16 and 17 are attached, respectively. Although not shown in this figure, the first or second active material layers 11b and 13b may be formed on only the inner surface of the first or second collector 11a and 13a positioned at the outermost portion in the winding-type electrode assembly 10.

Here, the pores 14 and 15 may be formed in regions corresponding to the central portion in the length direction of the electrode assembly 10 in the state in which the electrode assembly 10 is wound. The pores 14 and 15 may be formed in every central portion of the first and second collectors 11a and 13a, respectively.

Hereinafter, the first electrode plate 11, the second electrode plate 13 and the separator 12 will be described in detail. Although the first and second electrode plates 11 and 13 are slightly different depending on the kind of secondary battery, an electrode plate is generally formed by coating slurry on a metal base material, drying the metal base material and then roll-pressing and cutting the metal base material. In this case, the slurry includes active materials of the first and second electrode plates 11 and 13, and a fixing agent that allows the active material to be adhered to a metal foil.

As described above, the first electrode plate 11 may be a positive electrode plate and the second electrode plate 13 may be a negative electrode plate. In a lithium secondary battery, an oxide containing lithium may be used as a positive electrode active material, and any one of hard carbon, soft carbon, graphite and carbon material may be mainly used as a negative electrode active material. However, the present disclosure is not limited to the lithium secondary battery.

The first electrode plate 11 includes a sheet-shaped first collector 11a and a positive electrode slurry coated on the first collector 11a. The second electrode plate 13 includes a sheet-shaped second collector 13a and a negative electrode slurry coated on the second collector 13a. The separator 12 is positioned between the first and second electrode plates 11 and 13 so as to prevent a short circuit between the electrode plates and to allow the movement of lithium ions.

The positive electrode slurry is prepared by mixing a positive electrode active material, a conducting agent and a positive binder through a solvent. The positive electrode slurry generates electrons by participating in a positive electrode chemical reaction of the lithium secondary battery. For example, the positive electrode active material may include lithium complex metal oxides such as $LiCoO_2$, $LiMn_2O_4$, $LiNiO_2$, $LiNi-xCoxO_2$ (0<x>1) and $liMnO_2$ (here, M is a metal such as Al, Sr, Mg or La). However, the present disclosure is not limited thereto.

The negative electrode slurry includes a negative electrode active material and a negative electrode binder. Here, the negative electrode active material may include any one of a carbon material such as crystalline carbon, amorphous carbon, carbon complex or carbon fabric, a lithium metal and a lithium alloy. However, the present disclosure is not limited thereto.

The first and second collectors 11a and 13a may be formed of one selected from the group consisting of stainless steel, nickel, copper, aluminum and alloy thereof. In one embodiment, for the purpose of maximizing efficiency, the first collector 11a is formed of aluminum or aluminum alloy and the second collector 13a is formed of copper or copper alloy.

The separator 12 is interposed between the first and second electrode plates 11 and 13, and a thin film having high ion transmittance and mechanical strength is used as the separator 12. The separator 12 prevents an electric short circuit between positive and negative electrodes in the charging/discharging operation of the battery, and enables only the movement of lithium ions. The width and length of the separator 12 may be formed to be slightly greater than those of each of the first and second electrode plates 11 and 13 so as to prevent a short circuit between edge portions of the first and second electrode plates 11 and 13.

The separator 12 may be formed of a micro-porous material through which the movement of lithium ions is possible. For example, the separator 12 may be formed of polyethylene (PE), polypropylene (PP), polyolefin resin or equivalent thereof, which has micro-pores. However, the present disclosure is not limited thereto.

Figure 4:
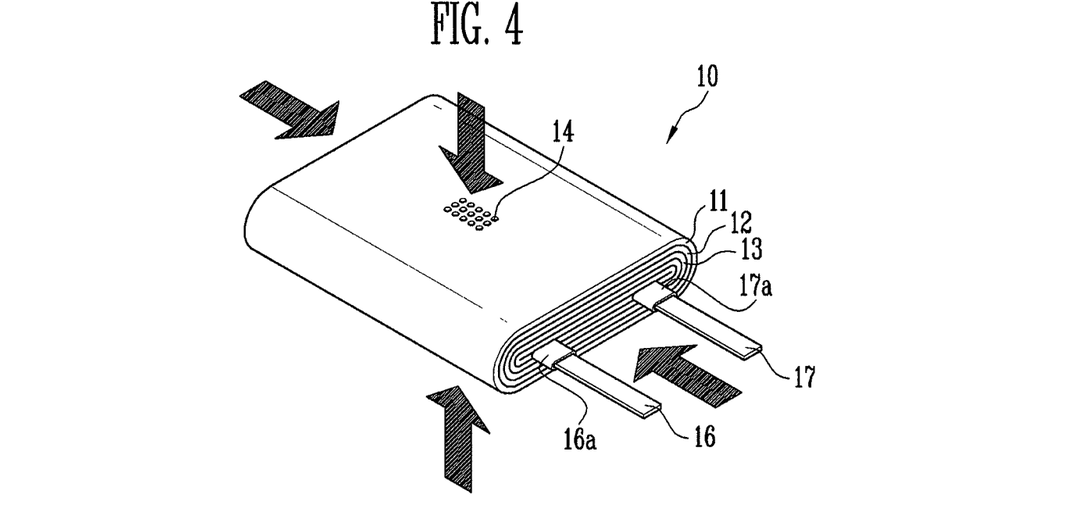
FIG. 4 is a perspective view showing a path along which an electrolyte is infiltrated into the electrode assembly according to one embodiment.

FIG. 4 is a perspective view showing a path along which an electrolyte is infiltrated into the electrode assembly according to one embodiment.

Referring to FIG. 4, the pores 14 are formed at the central portion in the length direction of the electrode assembly 10, so that the electrolyte can be infiltrated into the top/bottom and central portions in the length direction of the electrode assembly 10. Accordingly, the electrode assembly 10 can be sufficiently wetted up to the central portion in the electrolyte within a short period of time, so that it is possible to prevent a decrease in the capacity of the battery and to improve the productivity of the battery.

In this case, the pore 14 of the electrode assembly 10 is formed using a laser galvanometer, and accordingly, a burr is not formed at the peripheral portion of the pore 14. The pore 14 may be formed to have a diameter or width of about 0.1 μm to about 50 μm. In one embodiment, all of the pores may have the same diameter (widths). In another embodiment, at least two pores have different diameters (widths). The above range provides certain advantages. When the diameter (width) of the pore 14 is less than 0.1 μm, the pore 14 may be too small, and therefore, the electrolyte may not be well infiltrated through the pore 14. However, in the diameter (width) range of about 0.1 μm to about 50 μm, the electrolyte can be sufficiently wetted into the electrolyte. When the diameter (width) of the pore 14 exceeds 50 μm, the slurry may flow down through the pore 14. However, depending on the embodiment, the diameter (width) of the pore 14 may be less than about 0.1 μm or greater than about 50 μm. In another embodiment, at least one of the pores has a diameter (width) less than 100 μm. The diameter (width) of the pore represents the greatest distance between two opposing points of the periphery of the pore.

In the diameter range of about 0.1 μm to about 50 μm, although the slurry is coated on each of the first and second collectors 11a and 13a having the pores 14 formed therein, at least part of the slurry does not pass through the pore 14 due to surface tension. That is, the slurry can be coated on each of the first and second collectors 11a and 13a having the pores 14 formed therein.

Figure 5A:
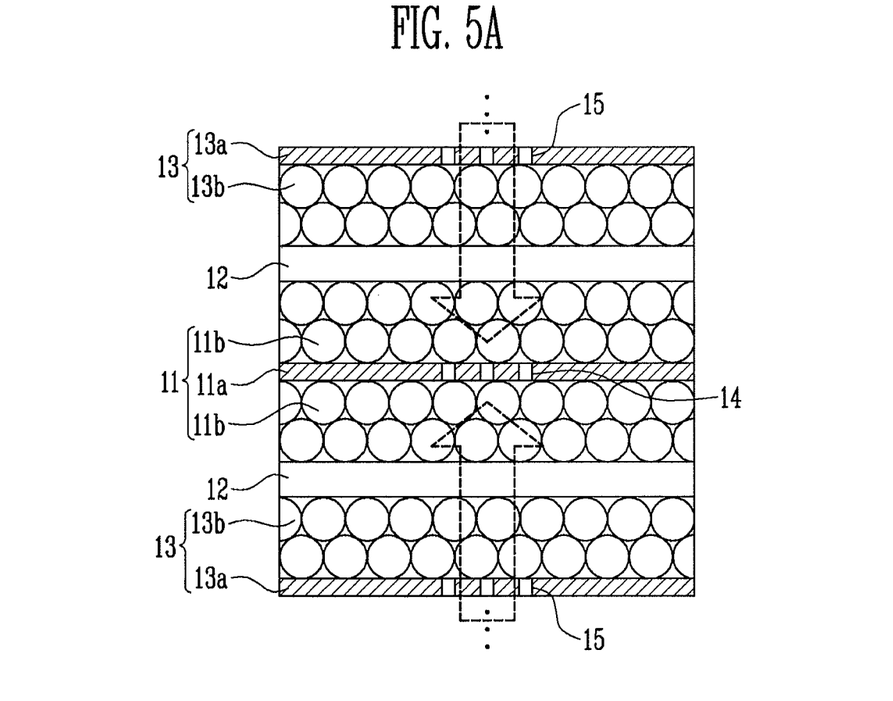
FIG. 5A is a cross-sectional view taken along line A-A' of FIG. 2 before an electrolyte is infused into the electrode assembly.
Figure 5B:
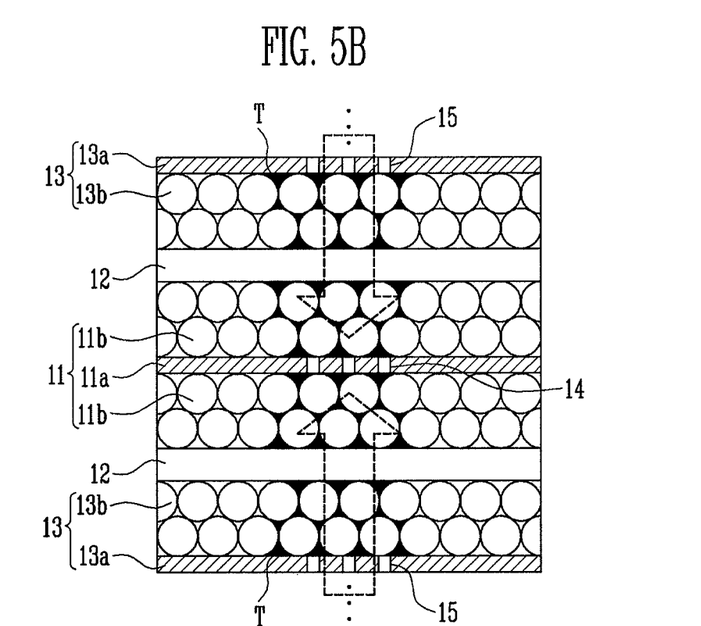
FIG. 5B is a cross-sectional view taken along line A-A' of FIG. 2 after an electrolyte has been infused into the electrode assembly.

FIG. 5 is a cross-sectional view taken along line A-A' of FIG. 2 before an electrolyte is infused into the electrode assembly. FIG. 5B is a cross-sectional view taken along line A-A' of FIG. 2 after an electrolyte has been infused into the electrode assembly.

Referring to FIG. 5A, in the section of the wound electrode assembly 10 (See FIG. 2), the first electrode plate 11 is positioned opposite to the second electrode plate 13 with the separator 12 interposed therebetween. At least one pore 14 or 15 is formed in the first or second collector 11a or 13a of the first or second electrode plate 11 or 13. The pores 14 and 15 may be formed at the central portion of the electrode assembly 10.

In the charging operation of the secondary battery, lithium ions move from the first active material layer 11b to the second active material layer 13b. That is, the lithium ions generated from a lithium compound pass through the electrolyte and the separator 12 and move to the second active material layer 13b. In the discharging operation of the secondary battery, lithium ions are formed as a lithium compound by passing through the electrolyte and the separator 12 from the second active material layer 13b.

In this case, the pores 14 and 15 are respectively formed at the central portions of the first and second collectors 11a and 13a, so that the electrolyte can be easily infiltrated into the central portion of the electrode assembly 10. That is, the pores 14 and 15 can make a path along which the electrolyte can be infiltrated into the electrode assembly 10. Accordingly, the electrode assembly 10 is wetted into the electrolyte within a short period of time, so that it is possible to improve the productivity of the battery and to prevent a decrease in the capacity and performance of the battery.

FIG. 5B shows that the electrolyte is easily infused into the central portion of the electrode assembly 10 via the pores 14 and 15. The dark region (T) of FIG. 5B represents that the electrolyte is moving toward the innermost portion of the electrode assembly 10 from both sides of the electrode assembly 10 (see the two arrows in FIG. 5B).

Hereinafter, a manufacturing method of the secondary battery according to one embodiment will be described.

In the secondary battery according to one embodiment, at least one pore 14 or 15 is formed at a predetermined interval along the wound direction of the electrode assembly 10 in the first or second collector 11a and 13a. In this case, the pores 14 and 15 are formed to be positioned at the central portion in the length direction of the wound electrode assembly 10.

The first and second active material layers 11b and 13b are formed on the first and second collectors 11a and 13a having the pores 14 and 15 formed therein, respectively. Thus, when the first and second active material layers 11b and 13b are formed, the slurry does not pass through the pore 14 or 15 but is coated on the first or second collector 11a or 13a due to the surface tension.

Here, the pores 14 and 15 may be formed using a laser or a laser galvanometer. In one embodiment, a burr is not formed at a peripheral portion of the pore 14 or 15. In this embodiment, the periphery of each of the pores 14 and 15 has a substantially smooth or even surface.

The burr, if formed at the peripheral portion, may cause a short circuit while coming in contact with the electrode plate having a different polarity. That is, when the pore 14 or 15 is mechanically formed, the height of the peripheral portion of the pore 14 or 15 may be formed higher than that of other regions of the first or second collector 11a and 13a. However, in the present embodiment, when the pore 14 or 15 is formed using the laser or laser galvanometer, the height of the peripheral portion of the pore 14 or 15 may be formed substantially similar to that of other regions of the first or second collector 11a and 13a.

Then, the electrode assembly is formed by interposing the separator 12 between the first and second electrode plates 11 and 13 having the first and second active material layers 11b and 13b respectively formed thereon and then winding the electrode plates. Accordingly, it is possible to manufacture the secondary battery in which the electrolyte can be easily infiltrated into even the central portion of the electrode assembly 10.

According to at least one of the disclosed embodiments, an electrode assembly (including, but not limited to, a winding-type and a stacking-type) is wetted in an electrolyte within a short period of time, so that it is possible to improve the productivity of the secondary battery. Further, lithium dendriting is substantially prevented by easily wetting a central portion of the electrode assembly in the electrolyte, so that it is possible to prevent a decrease in the lifetime of cells, a decrease in the capacity of cells and a fine short circuit between cells. When the electrode assembly has a large area, it is possible to obtain a greater effect.

While the above embodiments have been described in connection with the accompanying drawings, it is to be understood that the present disclosure is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
   an electrode assembly; and
   a case accommodating the electrode assembly,
   wherein the electrode assembly comprises:
   a first electrode plate comprising a first collector and a first active material layer formed on at least one side of the first collector;
   a second electrode plate comprising a second collector and a second active material layer formed on at least one side of the second collector; and
   a separator interposed between the first and second electrode plates,
   wherein a plurality of pores are formed only in part of the first and second collectors,
   wherein the pores comprise a plurality of spatially distinct groups of pores formed in one of the first and second collectors,
   wherein no pores are formed between adjacent groups of pores,
   wherein distances taken along a length of the one of the first and second collectors between the adjacent groups of pores are greater than distances between the pores within each of the groups,
   wherein each and every spatially distinct group of pores is fully surrounded by a region of the one of the first and second collectors where no pores are formed, and
   wherein at least one of the groups of pores includes a plurality of pores arranged in a matrix having a plurality of rows and columns.

2. The secondary battery of claim 1, wherein the pores are configured to infuse an electrolyte from the outermost surface of the electrode assembly to the inner most surface of the electrode assembly.

3. The secondary battery of claim 1, wherein the electrode plates and separator are wound such that each of the electrode plates includes repeating portions, and wherein the pores are formed in the repeating portions of the collectors such that the collectors have substantially aligned sets of pores.

4. The secondary battery of claim 1, wherein the part is less than about 50% of the area of the first and second collectors.

5. The secondary battery of claim 1, wherein the electrode assembly has a height, and wherein at least one of the groups of the pores are formed in a region adjacent to a middle portion of the height.

6. The secondary battery of claim 5, wherein the pores are formed only in the region.

7. The secondary battery of claim 1, wherein each of the pores has a width less than 100 μm, and wherein the width of the pore represents the greatest distance between two opposing points of the periphery of the pore.

8. The secondary battery of claim 7, wherein the width is in the range of about 0.1 μm to about 50 μm.

9. The secondary battery of claim 1, wherein at least one of the pores has a substantially regular geometric shape.

10. The secondary battery of claim 9, wherein the regular geometric shape comprises a substantially circular or polygonal shape.

11. The secondary battery of claim 1, wherein the first collector comprises a first plurality of sub-collectors which substantially overlap with each other, wherein the second collector comprises a second plurality of sub-collectors which substantially overlap with each other, wherein the first sub-collectors are alternately formed with respect to the second sub-collectors, and wherein the pores are formed in all of the first and second sub-collectors.

12. The secondary battery of claim 11, wherein at least some of the pores formed in each of the sub-collectors are substantially aligned with at least some of the pores formed: in the remaining sub-collectors so as to form a substantially linear passage.

13. The secondary battery of claim 12, wherein the linear passage is configure to infuse an electrolyte from the outermost surface of the electrode assembly to the inner most surface of the electrode assembly.

14. A method of manufacturing an electrode assembly for a secondary battery, comprising:
  providing first and second collectors;
  forming a plurality of pores only in part of the first and second collectors;
  forming a first active material layer on at least one side of the first collector;
  forming a second active material layer on at least one side of the second collector; and
  winding or stacking the first and second collectors with a separator interposed therebetween to form an electrode assembly,
  wherein the pores comprise a plurality of spatially distinct groups of pores formed in one of the first and second collectors,
  wherein no pores are formed between adjacent groups of pores,
  wherein distances taken along a length of the one of the first and second collectors between the adjacent groups of pores are greater than distances between the pores within each of the groups,
  wherein each and every spatially distinct group of pores is fully surrounded by a region of the one of the first and second collectors where no pores are formed, and
  wherein at least one of the groups of pores includes a plurality of pores arranged in a matrix having a plurality of rows and columns.

15. The method of claim 14, wherein each of the pores has a width in the range of about 0.1 μm to about 50 μm, and wherein the width of the pore represents the greatest distance between two opposing points of the periphery of the pore.

16. The method of claim 14, wherein the pores are formed by a laser.

17. The method of claim 14, wherein the periphery of each of the pores has a substantially smooth or even surface.

18. The method of claim 14, wherein at least one of the pores is formed such that a burr is not created at the periphery of the pore.

19. The method of claim 14, wherein the pores are substantially aligned in the collectors.

20. The method of claim 19, further comprising infusing an electrolyte into substantially a center of the electrode assembly through the substantially aligned pores.

* * * * *